US006433957B1

(12) United States Patent
Rudd et al.

(10) Patent No.: US 6,433,957 B1
(45) Date of Patent: Aug. 13, 2002

(54) PHOTOCATALYTIC DEVICE FOR DISK DRIVE CONTAMINATION REDUCTION

(75) Inventors: Gregory I. Rudd, Aptos, CA (US); Karl H. Scheppers, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/687,057

(22) Filed: Oct. 12, 2000

Related U.S. Application Data

(60) Provisional application No. 60/158,838, filed on Oct. 12, 1999.

(51) Int. Cl.[7] .............................................. G11B 17/02
(52) U.S. Cl. .................................................. 360/97.02
(58) Field of Search ........................... 360/97.02, 97.03

(56) References Cited

U.S. PATENT DOCUMENTS

| 5,023,739 A | | 6/1991 | Shinohara et al. | |
| 5,097,129 A | * | 3/1992 | de Vries et al. | 360/97.03 |
| 5,124,856 A | * | 6/1992 | Brown et al. | 360/97.03 |
| 5,229,899 A | | 7/1993 | Brown et al. | |
| 5,500,038 A | | 3/1996 | Dauber et al. | |
| 5,706,573 A | | 1/1998 | Lee | |
| 5,734,521 A | | 3/1998 | Fukudome et al. | |
| 5,827,424 A | | 10/1998 | Gillis et al. | |
| 5,873,203 A | | 2/1999 | Thiel | |
| 6,005,660 A | | 12/1999 | Yoshida et al. | |
| 6,012,267 A | | 1/2000 | Katsumata | |
| 6,046,403 A | | 4/2000 | Yoshikawa et al. | |
| 6,048,910 A | | 4/2000 | Furuya et al. | |

FOREIGN PATENT DOCUMENTS

| EP | 0 769 322 | 4/1997 |
| JP | 09 251751 | 9/1997 |
| JP | 09 252185 | 9/1997 |
| JP | 11 227940 | 8/1999 |
| WO | WO 96 37281 | 11/1996 |
| WO | WO 97 00717 | 1/1997 |

* cited by examiner

Primary Examiner—Robert S. Tupper

(57) ABSTRACT

A contaminant reduction system comprises an assembly of appropriate size and shape for mounting within a sealed or semi-sealed hard disk drive (HDD). The system comprises a photocatalytic surface mounted in close proximity or in contact with a light source which may be utilized as a means for activation. The photocatalytic surface is preferably titanium dioxide ($TiO_2$); it may be other metal oxide catalyss that can be photochemically activated such as zinc oxide (ZnO). The activation is achieved utilizing a lamp which illuminates the photocatalyst and has an output below 100 nm.

31 Claims, 5 Drawing Sheets

PHOTOCATALYTIC DEVICE FOR DISK DRIVE CONTAMINATION REDUCTION

CROSS REFERENCE TO RELATED APPLICATION

This application claims the benefit and priority date of Provisional Application Serial No. 60/158,838, filed Oct. 12, 1999, in the name of Gregory I. Rudd and Karl H. Scheppers and entitled "Photocatalytic Device for Disc Drive Contamination Reduction."

FIELD OF THE INVENTION

The present invention relates generally to hard disk drives, and more particularly, to the reduction of contamination in hard disk drives.

BACKGROUND OF THE INVENTION

The internal environment of a modern computer hard disk drive (HDD) is critical to its function. The so-called head-disk interface (HDI) or area between the "head" which holds the reading and writing elements and the disk surface is very susceptible to contamination because the gap (height at which the head flies above the disk) is so small. The amount of data that can be stored on a disk is proportional to this gap. In present designs the gap is less than 30 nanometers ($30 \times 10^{-9}$ meters). To allow this, the disks also must be very smooth. Most present designs require the head to land on the disk when the disk drive is shut off. Upon start up, it must easily lift off the disk and leave no residue or damage behind.

Liquid or gaseous contamination can cause failure by several modes:

The sticking of the head to the disk, usually due to vapor from liquids or low melting solids, is especially intractable in the disk drive industry.

Corrosion of the disks can roughen the surface; corrosion of the heads can affect electrical performance.

The fly height can be impacted by build-up of liquid or solid residue on the head, making data reading and writing unreliable.

Vapor concentrations as low as parts per billion of some common chemicals can cause catastrophic failure by one of these means. Changes in HDD technology such as lower flying heights, smoother disk surfaces, and lower power consumption by the spindle motor have all contributed to the greater sensitivity of new designs to these problems. Numerous schemes to minimize the hazard have been executed, and all have shortcomings as evidenced by the fact the HDI failures are a major limit to disk drive reliability.

One scheme common to almost all disk drives is to limit the use of materials inside the HDD known to "outgas" or generate vapors under operating conditions. This has been partly successful but notable problems are:

No other industry and hence no piece part vendor has knowledge of the sensitivity of this issue in the HDD, so subcomponent manufacturers cannot always provide adequate materials.

Testing methods are usually not as sensitive to contamination as is the HDI and small percentage failures can be very costly in terms of lost business.

Increasing sensitivity of advanced designs has meant that previously acceptable materials can result in failure when used for new designs.

Cost of well-controlled materials is much higher than less controlled materials. Market forces to reduce cost encourage the use of marginally acceptable materials (adhesives, plastics, and contaminated parts).

Common "dirt" such as hydrocarbon oils and silicones must be removed by careful and expensive cleaning processes.

Some necessary components are intrinsically vapor generating (e.g., bearing grease).

Another commonly used scheme has been to design the drive to leak with respect to the outside environment, ensuring that vapors from internal components are continuously diluted with fresh air. Obviously this scheme will fail if the outside environment, which is beyond the control of the HDD manufacturer, contains a harmful vapor or a material which in excess causes reliability problems (humidity is the best example).

A third commonly used scheme is to include a sorbent or adsorbent material, e.g., activated charcoal, inside the HDD. This is highly beneficial but demonstrably limited in its success. The sorbent is necessarily limited in its capacity for contaminants; it will eventually become saturated if continuously exposed. Also, the principal of sorption, whether physical or chemical, is reversible to varying degrees. Contaminants adsorbed at one temperature will be desorbed as the temperature rises. The present invention provides a solution to this and other problems as it comprises a device for purifying the internal atmosphere of an HDD.

SUMMARY OF THE INVENTION

The present invention comprises an assembly that includes a photocatalytic material and a device for activating photocatalytic material.

In accordance with one embodiment of the invention, an assembly of appropriate size and shape for mounting within a sealed or semi-sealed hard disk drive (HDD) is provided. More specifically, a photocatalytic surface is provided in close proximity or in contact with a light source which may be utilized as a means for activation.

The photocatalytic surface is preferably titanium dioxide ($TiO_2$); it may be other metal oxide catalysts that can be photochemically activated such as zinc oxide (ZnO).

The invention comprises an assembly that contains a photocatalytic material and a means for activating thereof. The assembly is of appropriate size and shape for mounting within a sealed or semisealed HDD. The catalytic activity of the photocatalytic material is engineered to cause chemical reactions of the vapor contaminants within the disk drive enclosure, which impinge on it, converting them to harmless gaseous species. The most important photocatalytic process for this purpose is photocatalytic oxidation.

This approach has many inherent advantages over the current state of the art. The catalytic surface would never be exhausted, as would an absorbent. Elevated temperature would not cause re-release of contaminants because they would be destroyed. The HDD could be almost or entirely hermetically sealed against humidity and other environmental contaminants without concern that the HDD component outgassing would poison the drive. This could allow an inert atmosphere (e.g., helium) to be maintained in the drive to lower power consumption, reduce disk vibration and flutter, or reduce chemical reactions on the disk. The use of the catalyst could also permit the use of "dirtier" components, reducing manufacturing costs. Alternately, lifetime of a drive could be increased with the same quality and cleanliness of components presently used. The capacity of the catalyst would only be limited by the surface area, which could comprise a great portion of the interior illuminated surface, and the illumination power available. The location of the catalyst is chosen to allow maximum exposure to the atmosphere in the drive; preferably it is located in the flow paths to the drive consisting of a photocatalytic surface in close proximity or contact with a light source as a means for activation.

In one preferred embodiment, a non-friable, high surface area $TiO_2$ (titanium dioxide) coating is applied to a fluorescent lamp with substantial light output in the UV spectrum (below 400 nm wavelength, and most preferably below 300 nm wavelength) and of a size to fit within a disk drive. Such a coating can be applied by e.g., dipping the lamp in a sol-gel dispersion of $TiO_2$ and curing at elevated temperature.

Another preferred embodiment is substantially the same as above except the catalytic surface consists of a sheath of porous $TiO_2$-containing ceramic that fits over the lamp.

In another embodiment, the catalytic surface consists of particulate $TiO_2$ enclosed in a mesh or porous material that wraps or slips around the lamp, preventing the particulate catalyst from escaping but allowing free exchange of gases.

In another embodiment similar to that above, the catalytic surface consists of a mesh (glass or fabric) impregnated with $TiO_2$-catalyst.

In other embodiments otherwise similar to all of the above, the fluorescent lamp with substantial output below 300 nm could be replaced by one with substantial output below 400 nm but not 300 nm.

Alternatively, the fluorescent lamp could be replaced by an incandescent lamp with substantial output below 400 nm.

The lamp could also be replaced, in whole or in part, by a transparent window in the drive to allow ambient light or light from an external source to illuminate the catalytic surface(s) as described above. Banks of disk drives could be kept catalytically clean by this means.

In another embodiment of the invention, the method of illumination could be one such as described above, but the catalytic surface could be painted or attached to an area of the drive that could be illuminated. One such surface could be the cavity of the sliders, those hard ceramic structures that provide the air-bearing surface and to which the heads are attached. The advantage of having the catalytic surface on the slider would be the destruction of contaminants in an area where they ordinarily do great harm to the disk drive function.

These and various other features as well as advantages which characterize the present invention will be apparent upon reading of the following detailed description and review of the associated drawings.

DETAILED DESCRIPTION OF A PREFERRED EMBODIMENT

Figure 1:
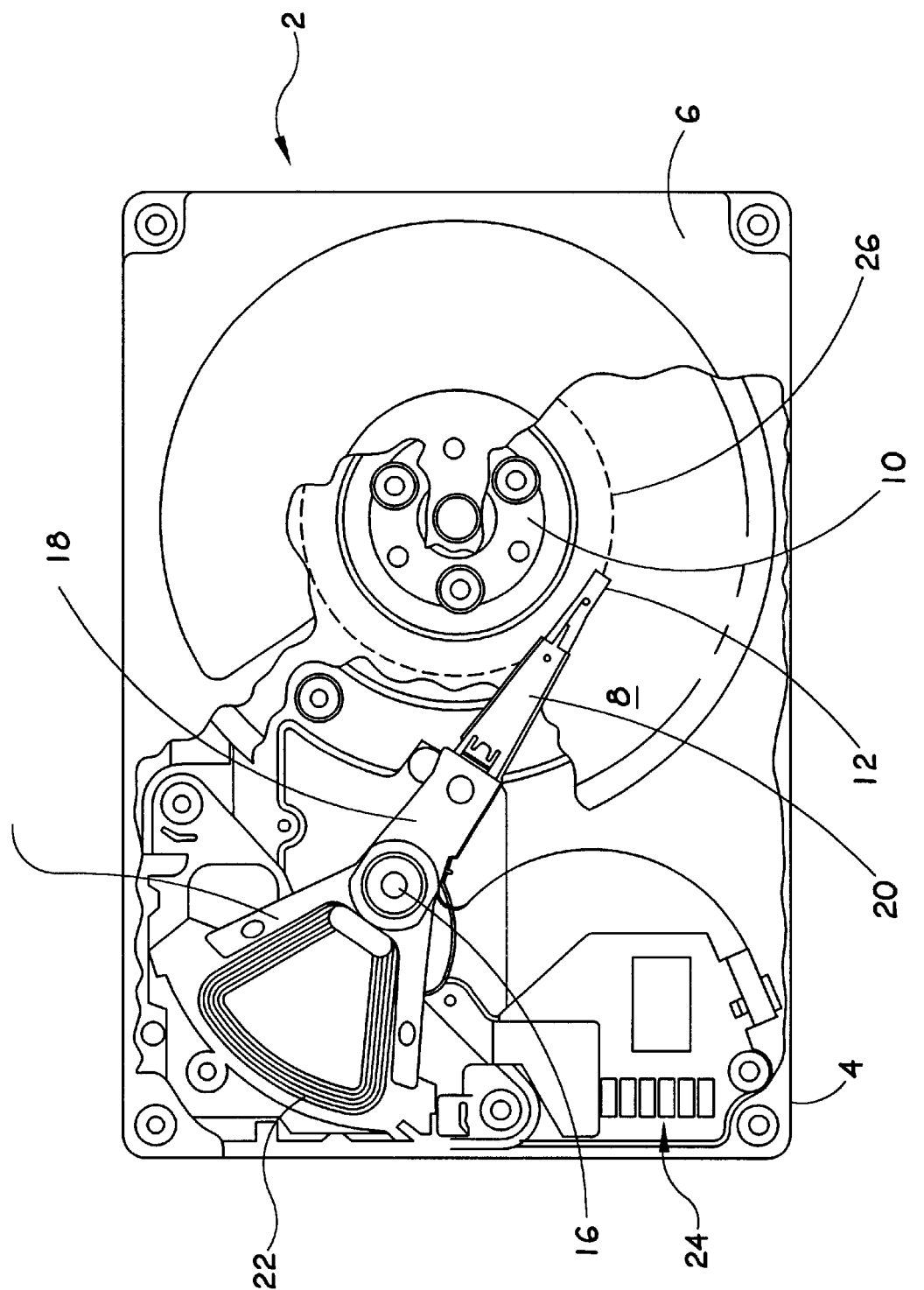
FIG. 1 is a plan view of a disk drive in which the present invention is useful.

Referring now to FIG. 1, this shows a plan view of a disk drive in which the present invention is useful.

The features of the disk drive are clearly only exemplary, and the present invention is useful in any size or configuration of disk drive in which internal contamination potentially presents a problem. The disk drive 2 includes a base member 4 in which internal components are mounted. Base member 4 couples to a top cover 6 which forms a sealed environment or cavity within the housing so established for critical parts of disk drive 2.

Disk drive 2 includes one or more disks 8 which are mounted for rotation on a spindle motor generally indicated at 10. A plurality of magnetic read write heads (not shown) are supported each on a slider twelve which is mounted to an actuator 14. In the example shown at drive 2, actuator 14 is rotary actuator which is mounted for pivoting about a pivot axis 16. Actuator 16 includes one or more head mounting arms 18, each of which couples a head to the actuator arm via a load gim-beam/gimbal assembly 20 which supports the slider to fly over the surface of the disk. The actuator motor 22 is also coupled to actuator 14 to provide a force to move these sliders 12 and the heads supported thereon to a desired position on the surface of the disk 8.

The present invention incorporates an assembly that includes a photocatalytic material and a device for activating photocatalytic material within the disk drive housing. In accordance with one embodiment of the invention, an assembly of appropriate size and shape for mounting within a sealed or semi-sealed hard disk drive (HDD) is provided as shown at 20 in FIG. 2. More specifically, a photocatalytic surface is provided in close proximity or in contact with a light source 22 which may be utilized as a means for activation. The photocatalytic surface may be titanium dioxide ($TiO_2$) or zinc oxide (ZnO) which is a metal oxide catalyst that can be photochemically activated.

The invention consists of an assembly that includes a photocatalytic material and a means for activation. The assembly is of appropriate size and shape for mounting within the sealed or semisealed HDD. The catalytic activity of the photocatalytic material is engineered to cause chemical reactions of the vapor contaminants within the disk drive enclosure, which impinge on it, converting them to harmless gaseous species. The most important photocatalytic process for this purpose is photocatalytic oxidation.

This approach has many inherent advantages over the current state of the art. The catalytic surface would not be exhausted, as would an absorbent. Elevated temperature would not cause re-release of contaminants because they would be destroyed. The HDD could be almost or entirely hermetically sealed against humidity and other environmental contaminants without concern that the HDD component outgassing would poison the drive. This could allow an inert atmosphere (e.g., helium) to be maintained in the drive to lower power consumption, reduce disk flutter, or reduce chemical reactions on the disk. The use of the catalyst could also permit the use of "dirtier" components, reducing manufacturing costs. Alternately, lifetime of a drive could be increased with the same quality and cleanliness of components presently used. The capacity of the catalyst would only be limited by the surface area, which could comprise a great portion of the interior illuminated surface, and the illumination power available. The location of the catalyst would be chosen to allow maximum exposure to the atmosphere in the drive; preferably it is located in the flow path around the rotating disc.

A preferred embodiment of the scheme consists of an assembly internal to the drive in a region close to the disk and where air flow over the photocatalytic surface is maximized, comprising a photocatalytic surface in close proximity or contact with a light source as a means for activation. In one embodiment shown in FIG. 2, a non-friable, high surface area $TiO_2$ (titanium dioxide) coating is applied to a fluorescent lamp 22 with substantial light output in the UV spectrum (below 400 nm wavelength, and most preferably below 300 nm wavelength) of a size to fit within a disk drive. Such a coating can be applied by e.g., dipping the lamp in a sol-gel dispersion of $TiO_2$ and curing at elevated temperature. The device is shown located adjacent the rotating disc to maximize the air flow over the photocatalyst.

Figure 3:
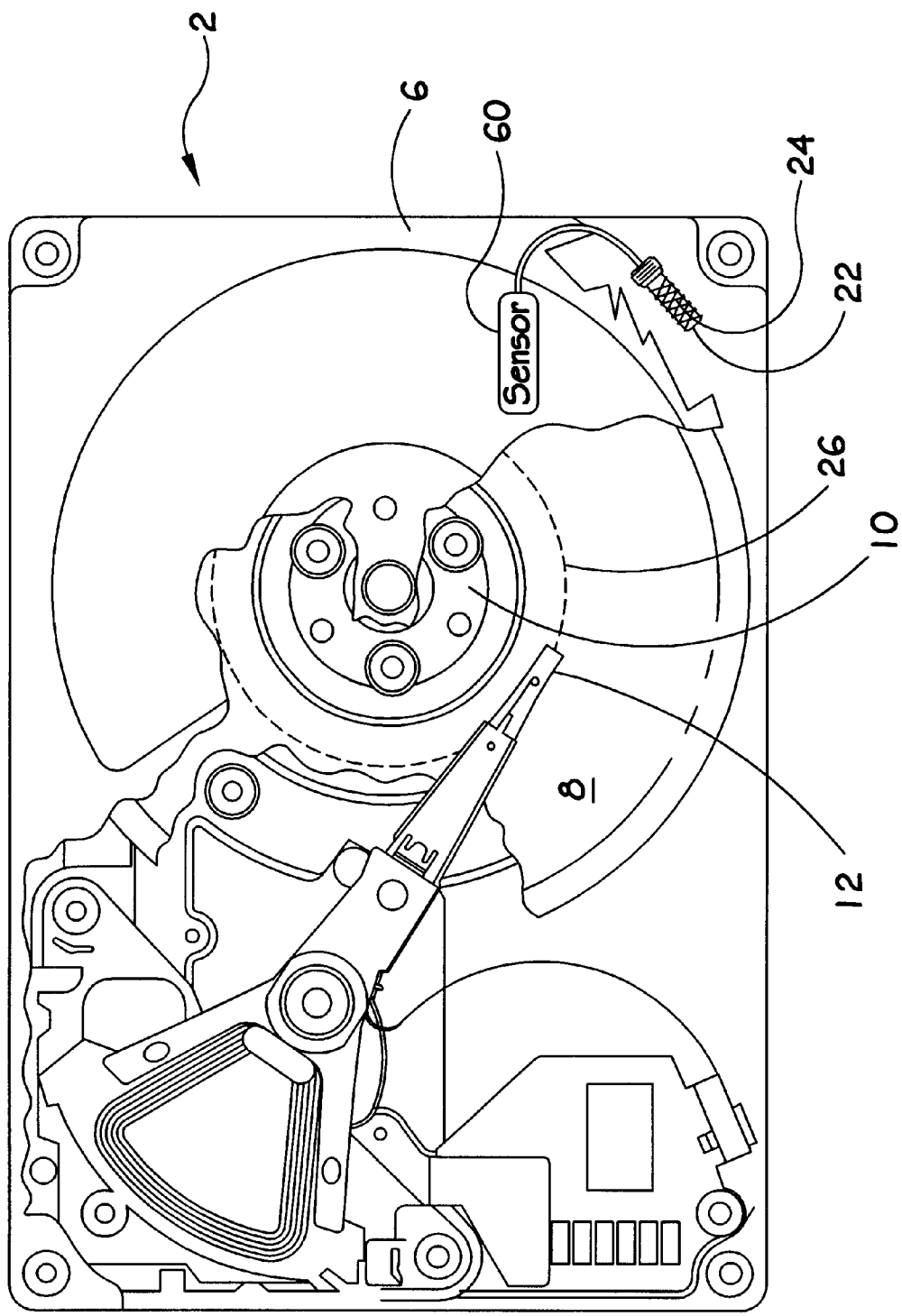

Another preferred embodiment is substantially the same as above except the catalytic surface consists of a sheath 24 (FIG. 3) of porous $TiO_2$-containing ceramic that fits over the lamp 22.

In another embodiment, the catalytic surface consists of particulate $TiO_2$ enclosed in a mesh or porous material 24 that wraps or slips around the lamp, preventing the particulate catalyst from escaping but allowing free exchange of gases.

In another embodiment similar to that above, the catalytic surface comprises mesh (glass or fabric) 24 impregnated with $TiO_2$-catalyst and slipped over the lamp.

In another embodiment otherwise similar to all of the above, the fluorescent lamp 22 with substantial output below 300 nm could be replaced by one with substantial output below 400 nm.

In yet another embodiment otherwise similar to all of the above, the fluorescent lamp 22 could be replaced by an incandescent lamp with substantial output below 400 nm.

Figure 4:
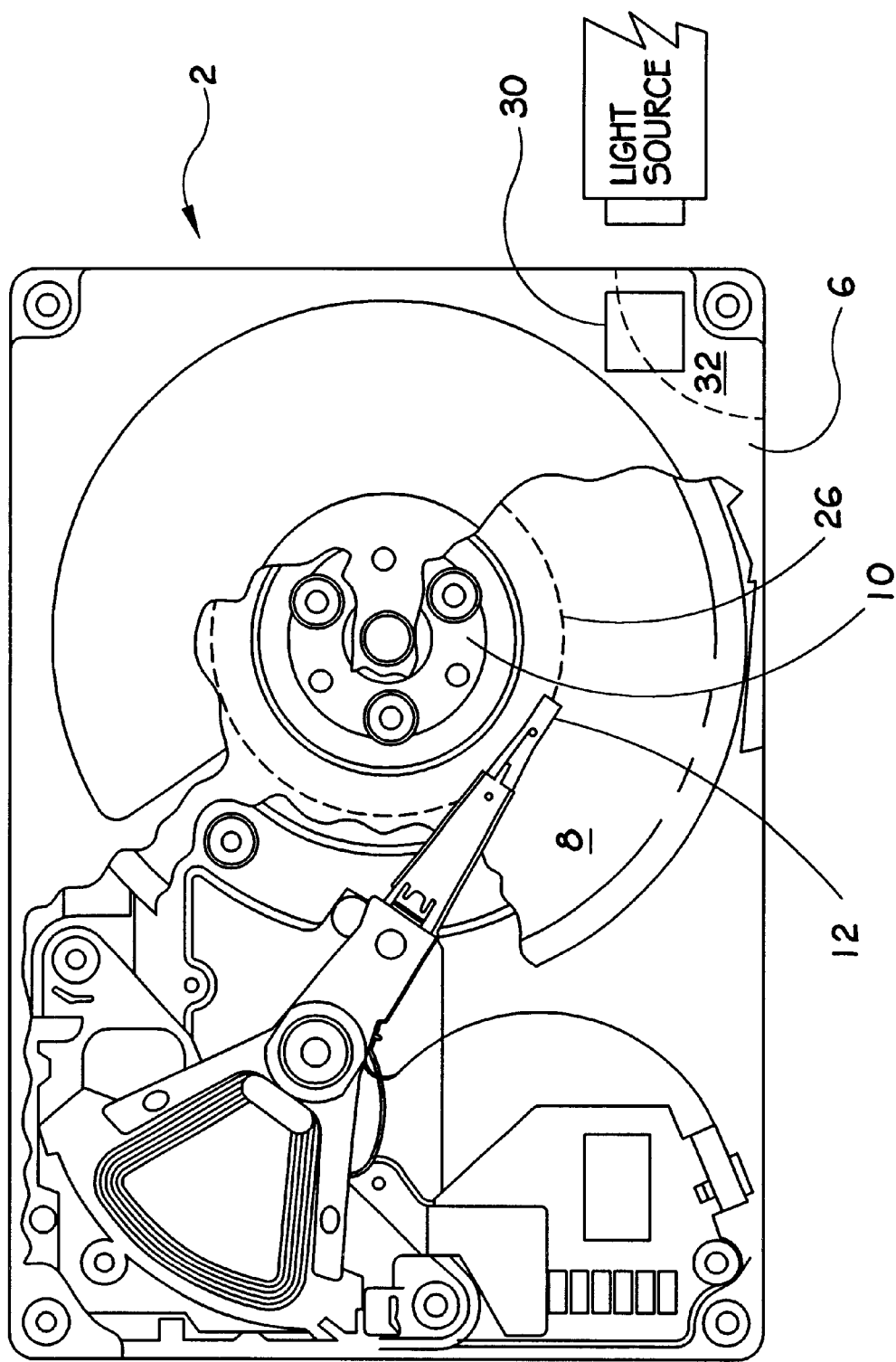

In yet another embodiment, the lamp could be replaced entirely by a transparent window 22 (FIG. 4) in the drive to allow ambient light or light from an external source to illuminate a catalytic surface(s) 32 in the air flow region as described above. Banks of disk drives could be kept catalytically clean by this means; also the window could be used in combination with an internal lamp.

In another embodiment of the invention, the method of illumination could be one such described above, but the catalytic surface could be painted or attached to an area of the drive that could be illuminated. One such surface could be a surface of the sliders 12, those hard ceramic structures that provide the air-bearing surface and to which the heads are attached. The advantage of having the catalytic surface on the slider would be the destruction of contaminants in an area where they ordinarily do great harm to the disk drive function.

In another embodiment similar to all of the above, the $TiO_2$ catalyst could be replaced by another metal oxide catalyst that can be photochemically activated, e.g., ZnO.

The photocatalytic technology most applicable to this invention uses $TiO_2$ (titanium dioxide) photocatalyst, a ceramic material that can be activated by ultraviolet light. The principal of the process is that the $TiO_2$ material forms electronic defects upon illumination by ultraviolet light. So-called "black light" (UV-A, 350–400 nm) is of sufficient energy to accomplish this, but visible light is not. UV-B (300–350 nm) and UV-C (250–300 nm) would be expected to be more efficacious. $TiO_2$ adsorbs water and other vapors onto its surface. The electronic defects created by illumination of $TiO_2$ convert water (only traces of water are required) to hydroxyl radicals. Hydroxyl radicals are highly reactive, and will oxidize any organic (carbon-containing) vapor, which is also adsorbed on the $TiO_2$. This oxidation process, which is essentially burning, converts the adsorbed organic vapor into water vapor and $CO_2$ (carbon dioxide), both of which are harmless to the drive in the small amounts that would be created. Since the vapor phase drive contaminants, which have caused reliability problems, are almost exclusively organic, they would be subject to destruction continuously, or whenever the photocatalyst was illuminated.

The lamps most appropriate are between 3 and 9 mm in diameter and between 25 and 100 mm long. The smallest uses about 0.7 watt of power and has a lifetime of 3,000 hours nominal, up to 8,000 hours for larger lamps. Lowering the voltage (and output) can extend lifetime. Lamps that emit in the 250–300 nm wavelength and 300–400 nm wavelength are available in some sizes. The lamp would probably not have to be in continuous use; for example it could be activated when the drive temperature rises (increasing the likelihood of outgassing), when stiction was detected (changes in fly height or motor starting torque) or some other contamination sensor was triggered (e.g., by light scattered off of a disk surface). All of these could be implemented by a sensor 60 (FIG. 3) well-known in this field. The catalytic activity would linger for some time after the illumination ceased.

Figure 5:
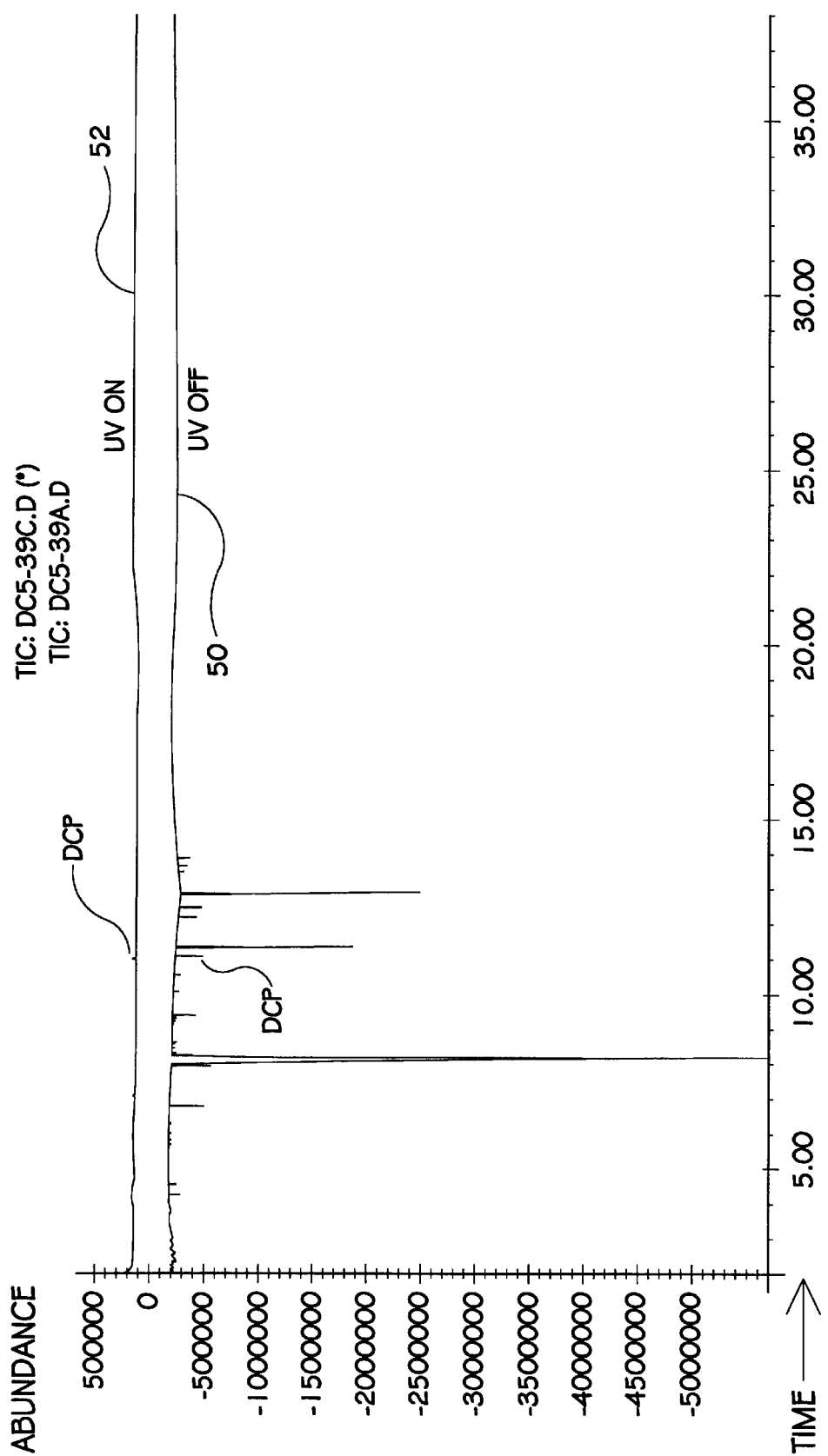
FIG. 5 illustrates the results of a test conducted using the present invention which demonstrates the effectiveness at eliminating contaminants of the present invention.

FIG. 5 illustrates a test run using the photocatalyst described above. The line marked "UV OFF" 50 shows the presence of contaminants; the line marked "UV ON", conducted in substantially the same atmosphere, shows the dramatic absence thereof.

Figure 2:
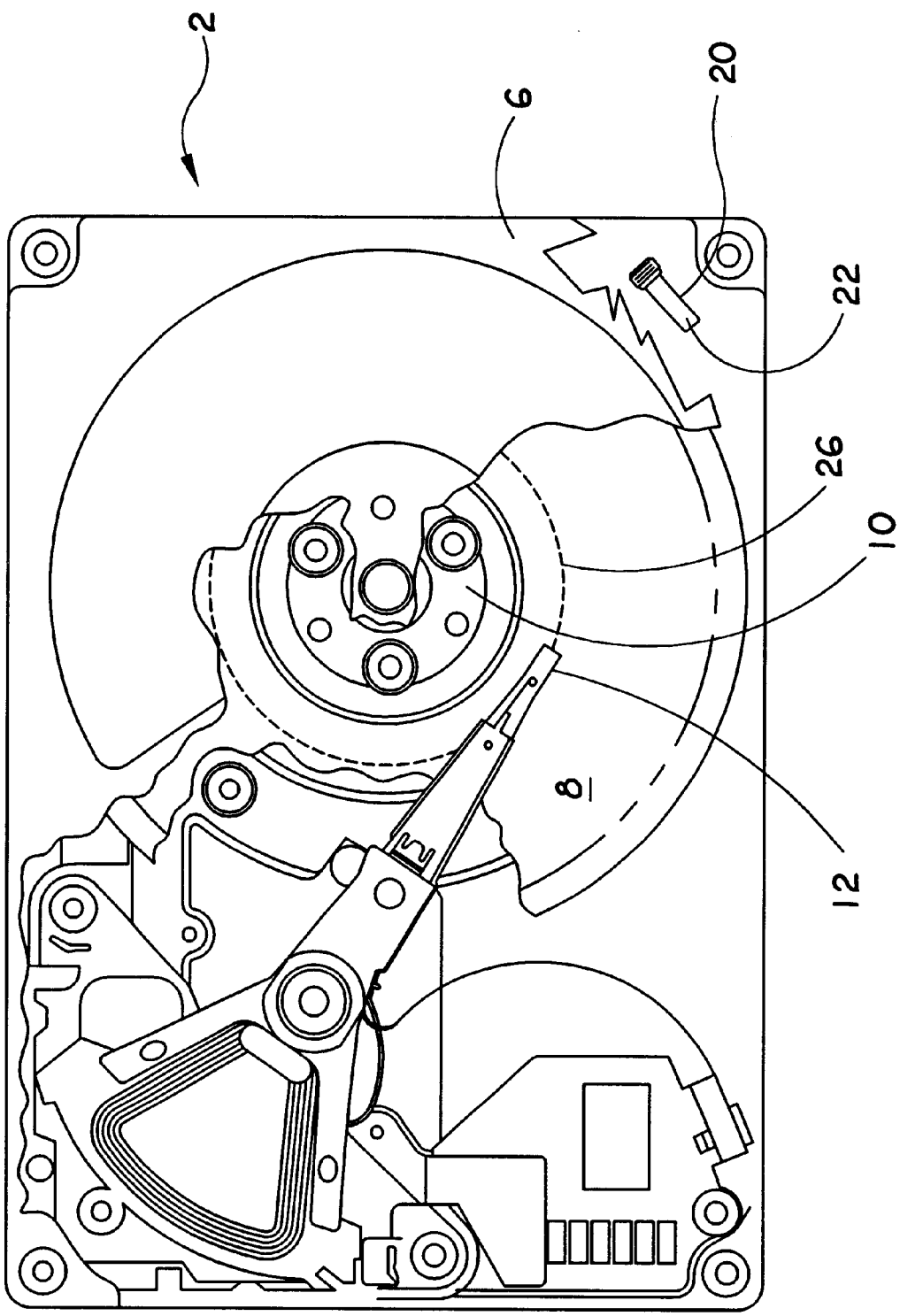
FIGS. 2 through 4 illustrate various exemplary embodiments of the present invention.

In summary, the present invention comprises a contaminant reduction system for an electronic device of the type having a housing 6 such as shown in FIG. 1 with a closed interior and having at least one critical component such as disc 8 or transducer 12 located within the housing which would be adversely affected by vapor contaminants within the housing. The contamination reduction system comprises, as shown in FIG. 2, a photocatalytic material 2 located within the closed interior of the housing, the photocatalytic material being located for chemically reacting with the vapor contaminants within the housing, and a device such as lamp 22 for activating the photocatalytic material so that the catalytic activity of the activated photocatalytic material causes a chemical reaction with the vapor contaminants which impinge on the photocatalytic material. The lamp preferably has an output below 400 nm. The lamp may comprise a fluorescent lamp with a substantial light output in the UV spectrum or an incandescent lamp with a substantial output below 400 nm. The device for activating the photocatalytic material may comprise a transparent window 30 in the drive housing which allows ambient light or light from an external source below 400 nm to illuminate the photocatalytic material. The photocatalytic material preferably comprises a metal oxide catalyst that can be photochemically activated. It may be chosen from the group comprising $TiO_2$ and ZnO. The photocatalytic material may be applied to a surface of the lamp, or to a surface of the housing which can be illuminated by the lamp, or to a surface on or near the critical component which is subject to adverse effect by vapor contaminants. The photocatalytic material may be supported on the head assembly 12, or more specifically on a slider included in the head disk assembly.

The invention can also be considered as a contaminant reduction method for an electronic device of the type having a housing with a closed interior and having at least one critical component located within the housing which would be adversely affected by vapor contaminants within the housing. The contamination reduction method comprises locating a photocatalytic material located within the closed interior of the housing, the photocatalytic material being located for chemically reacting with the vapor contaminants within the housing, and activating the photocatalytic material so that the catalytic activity of the activated photocatalytic material causes a chemical reaction with the vapor contaminants which impinge on the photocatalytic material. According to one approach, the photocatalytic material is activated only by sensing certain predefined conditions (See FIG. 3, 60). The photocatalytic material is preferably TiO. The activating step preferably includes activating a lamp with a substantial output below 400 nm to illuminate the photocatalytic material.

Other features and advantages of the invention will be apparent to a person who studies the above invention disclosure. Therefore, the scope of the present invention is to be limited only by the following claims.

What is claimed:

1. A contaminant reduction system for an data storage device of the type having a housing with an operably permanently closed interior and having at least one critical component located within the housing which would be adversely affected by vapor contaminants within the housing, the contamination reduction system comprising:
a photocatalytic material located within the operably permanently closed interior of the housing, the photocatalytic material being located for chemically reacting with the vapor contaminants within the housing, and a device for activating the photcatalytic material so that the catalytic activity of the activated photocatalytic material causes a chemical reaction with the vapor contaminants which impinge on the photocatalytic material.

2. The contaminant reduction system of claim 1 wherein the device for activating the photocatalytic material is a lamp with an output below 400 nm.

3. The contaminant reduction system of claim 2 wherein the lamp is a fluorescent lamp with a substantial light output in the UV spectrum.

4. The contaminant reduction system of claim 2 wherein the lamp comprises an incandescent lamp with a substantial output below 400 nm.

5. The contaminant reduction system of claim 1 wherein the device for activating the photocatalytic material comprises a transparent window in the drive housing which allows ambient light or light from an external source below 400 nm to illuminate the photocatalytic material.

6. The contaminant reduction system of claim 1 wherein the photocatalytic material is a metal oxide catalyst that can be photochemically activated.

7. The contaminant reduction system of claim 1 wherein the photocatalytic material is chosen from the group comprising $TiO_2$ and ZNO.

8. The contaminant reduction system of claim 1 wherein the device for activating the photocatalytic material is a lamp, and the photocatalytic material is applied to a surface of the lamp.

9. The contaminant reduction system of claim 1 wherein the device for activating the photocatalytic material is a lamp with an output in the UV spectrum, and the photocatalytic material is applied to a surface of the housing which can be illuminated by the lamp.

10. A contaminant reduction system as claimed in claim 1 wherein the device for activating the photocatalytic material is a lamp with a substantial light output in the UV spectrum, and the photocatalytic material is applied to a surface on or near the critical component which is subject to adverse effect by vapor contaminants.

11. A contaminant reduction system for a disk drive assembly including a housing with an operably permanently closed interior incorporating a head disk assembly located therein which would be adversely affected by vapor contamination within the disk drive assembly, the contaminant reduction system comprising:
a photocatalytic material located within the operably permanently closed interior of the housing, the photocatalytic material being located for chemically reacting with the vapor contaminants within the housing, and a device for activating the photocatalytic material so that the catalytic activity of the activated photocatalytic material causes a chemical reaction with the vapor contaminants which impinge on the photocatalytic material.

12. The contaminant reduction system of claim 11 wherein the photocatalytic material is supported on the head assembly.

13. The contaminant reduction system of claim 12 wherein the photocatalytic material is supported on a slider included in the head disk assembly.

14. A contaminant reduction system for a disk drive assembly, the contaminant reduction system comprising means for chemically reacting with the vapor contaminants within the assembly to oxidize the contaminants.

15. A contaminant reduction method for an data storage device of the type having a housing with an operably permanently closed interior and having at least one critical component located within the housing which would be adversely affected by vapor contaminants within the housing, the contamination reduction method comprising:
locating a photocatalytic material located within the operably permanently closed interior of the housing, the photocatalytic material being located for chemically reacting with the vapor contaminants within the housing, and activating the photocatalytic material so that the catalytic activity of the activated photocatalytic material causes a chemical reaction with the vapor contaminants which impinge on the photocatalytic material.

16. The contaminant reduction method of claim 15 wherein the photocatalytic material is activated only by sensing certain predefined conditions.

17. The contaminant reduction method of claim 15 wherein the photocatalytic material is TiO.

18. The contaminant reduction method of claim 17 wherein the activating step includes activating a lamp with a substantial output below 400 nm to illuminate the photocatalytic material.

19. The contaminant reduction method of claim 16 wherein the activating step is performed by the sensor activating a lamp with a substantial output below 400 nm to illuminate the photocatalytic material.

20. A data storage device, comprising:
an enclosure defining a substantially airtight environment;
a motor supported by the enclosure comprising a rotatable hub;
a data storage disc attached to the hub;
an actuator assembly moveable relative to the disc in an operable data reading and writing relationship within the airtight environment; and
a photocatalytic filter assembly eliminating contaminants within the airtight environment.

21. The data storage device of claim 20, wherein the photocatalytic filter assembly comprises a photocatalytic material applied to a surface of the enclosure within the airtight environment.

22. The data storage device of claim 20 wherein the photocatalytic filter assembly comprises:

a photocatalytic material; and an illumination source activating the photocatalytic material.

23. The data storage device of claim 22 wherein the actuator assembly comprises:

a mounting arm journaled to the enclosure;

a gimbal assembly depending from the mounting arm; and a slider aerodynamically responsive to airflow from moving discs in being spatially disposed from the disc, wherein the photocatalytic material is applied to the slider; and a read/write head supported by the slider.

24. The data storage device of claim 22 wherein the actuator assembly comprises:

a mounting arm journaled to the enclosure;

a gimbal assembly depending from the mounting arm, wherein the photocatalytic material is applied to the gimbal assembly; and a slider aerodynamically responsive to airflow from moving discs in being spatially disposed from the disc; and a read/write head supported by the slider.

25. The data storage device of claim 22 wherein the illumination source is disposed within the airtight environment.

26. The data storage device of claim 22 wherein the illumination source is disposed outside of the air-tight environment, the enclosure comprising a transparent member admitting communication between the illumination source and the photocatalytic material.

27. The data storage device of claim 22 further comprising a sensor indicating the presence of a contaminant within the airtight enclosure.

28. The data storage device of claim 27 wherein the illumination source is selectively responsive to the sensor in activating the photocatalytic material.

29. A data storage device, comprising:

an enclosure defining a substantially airtight environment;

a motor supported by the enclosure comprising a rotatable hub;

a data storage disc attached to the hub;

an actuator assembly moveable relative to the disc in an operable data reading and writing relationship within the airtight environment; and a photocatalytic material attached to the actuator assembly operably eliminating contaminants within the airtight environment.

30. The data storage device of claim 29 wherein the actuator assembly comprises:

a mounting arm journaled to the enclosure;

a gimbal assembly depending from the mounting arm; and a slider aerodynamically responsive to airflow from moving discs in being spatially disposed from the disc, wherein the photocatalytic material is applied to the slider; and a read/write head supported by the slider.

31. The data storage device of claim 29 wherein the actuator assembly comprises:

a mounting arm journaled to the enclosure;

a gimbal assembly depending from the mounting arm, wherein the photocatalytic material is applied to the gimbal assembly; and a slider aerodynamically responsive to airflow from moving discs in being spatially disposed from the disc; and a read/write head supported by the slider.

* * * * *